United States Patent [19]

LaBounty

[11] Patent Number: 4,771,540
[45] Date of Patent: * Sep. 20, 1988

[54] METAL GRAPPLE SHEAR

[76] Inventor: Roy E. LaBounty, 1607 8th Ave., Two Harbors, Minn. 55616

[*] Notice: The portion of the term of this patent subsequent to Dec. 17, 2002 has been disclaimed.

[21] Appl. No.: 775,141

[22] Filed: Sep. 12, 1985

Related U.S. Application Data

[63] Continuation of Ser. No. 434,428, Oct. 14, 1982, Pat. No. 4,358,515, which is a continuation-in-part of Ser. No. 416,902, Sep. 13, 1982, Pat. No. 4,319,135, which is a continuation-in-part of Ser. No. 238,157, Mar. 2, 1981, abandoned.

[51] Int. Cl.$^4$ ............................................. E02F 3/28
[52] U.S. Cl. ...................................... 30/134; 30/228; 144/34 E
[58] Field of Search ................ 30/134, 228; 144/34 E; 83/609

[56] References Cited

U.S. PATENT DOCUMENTS

| | | | |
|---|---|---|---|
| 3,802,731 | 4/1974 | LaBounty . | |
| 3,814,152 | 6/1974 | Pallari | 144/34 |
| 3,922,783 | 12/1975 | Hayes | 30/250 |
| 3,972,097 | 8/1976 | Schakat | 30/228 X |
| 4,017,114 | 4/1977 | LaBounty | 294/88 |
| 4,055,891 | 11/1977 | Wick | 30/250 |
| 4,104,792 | 8/1978 | LaBounty | 30/134 |
| 4,188,721 | 2/1980 | Ramun | 30/134 |
| 4,198,747 | 4/1980 | LaBounty | 30/134 |
| 4,217,000 | 8/1980 | Watanabe | 144/34 E |
| 4,248,471 | 2/1981 | LaBounty | 294/88 |
| 4,376,340 | 3/1983 | Ramun | 30/134 |
| 4,403,431 | 9/1983 | Ramun | 30/134 |
| 4,519,135 | 5/1985 | LaBounty | 30/134 |
| 4,558,515 | 12/1985 | LaBounty | 30/134 |

*Primary Examiner*—Douglas D. Watts
*Attorney, Agent, or Firm*—Palmatier & Sjoquist

[57] ABSTRACT

Apparatus for attachment to a boom of a backhoe or other mobile material handling machine, having a stick member pivotally attached to the boom, a first jaw and shear pivotally attached to the distal end of the stick member, and a second jaw and shear pivotally attached to the first jaw and shear, so that power actuation of one jaw causes opening and closing of the jaws and permits interleaved jaw engagement and shearing action between the jaws near the closure position. A heavy duty shear for a backhoe including a lower jaw having a shear blade and a guide blade lying along each other and tied together at their outer ends, an upper jaw defining a shear blade and having a wear plate or guide to engage and slide along the guide blade of the lower jaw, the guide blade of the lower jaw having is edge recessed below the level of the cutting edge of the shear blade of the lower jaw.

6 Claims, 5 Drawing Sheets

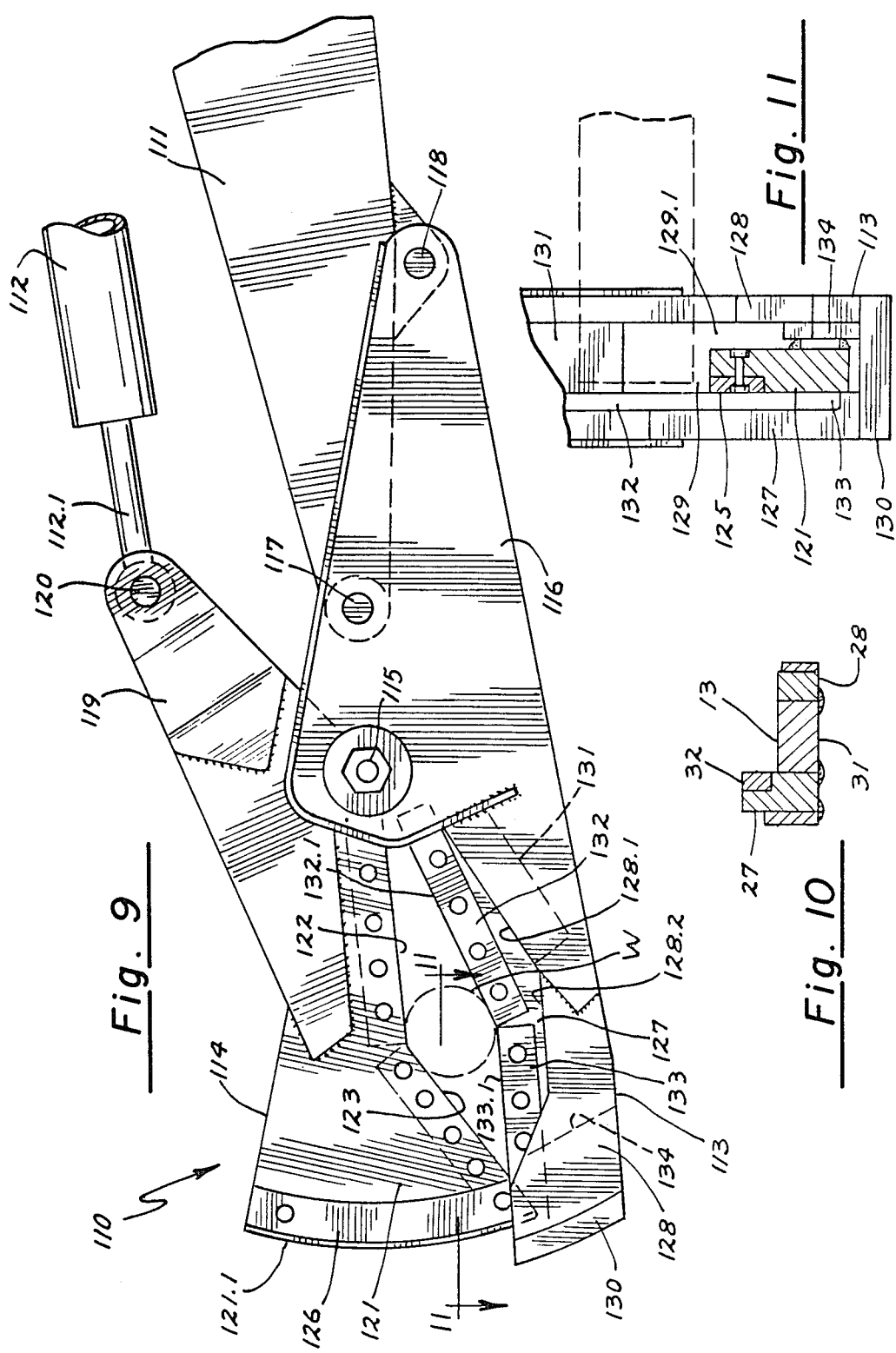

METAL GRAPPLE SHEAR

This application is a continuation of application Ser. No. 434,428, filed Oct. 14, 1982, now U.S. Pat. No. 4,558,515, issued Dec. 17, 1986, which is in turn a continuation-in-part of application Ser. No. 416,902, filed Sept. 13, 1982, now U.S. Pat. No. 4,519,135, which is in turn a continuation-in-part of application Ser. No. 238,157, filed Mar. 2, 1981, now abandoned.

BACKGROUND OF THE INVENTION

Machines of the type of interest to this invention typically have an elongated boom which is pivotally attached about a horizontal axis on the machine. The machine itself may be capable of several degrees of freedom of movement, and the distal end of the boom is capable of at least pivotal motion about the boom horizontal axis. Such machines may be used for demolition or clearing rubble at a work site, and may be used for other tasks such a assisting in the reclaiming of metals and other materials in junk yards and reclaiming centers. It is common for such activities to utilize bulldozers, backhoes, and front end loading devices for the handling, demolition and removal of rubble and reclaimable materials. Bulldozers are frequently used to push debris and rubble into piles and loaders of various types are then used to transfer the debris and rubble into trucks for removal from the work site. Rubble at a building demolition site may include all types of wood, concrete and steel materials and all of such materials frequently become entangled and interlocked with one another, making the removal task difficult. For example, demolition sites having steel-reinforced concrete materials among the rubble frequently require the use of electrical cutting torches to separate entangled steel members from the rubble to permit loading of trucks for removal from the site. The handling of such materials is not only dangerous but is also costly and time consuming. There has long been a need for a grapple which will permit the separation and loading of such debris and rubble quickly and without the necessity of stopping the machine loading process while debris remnants are cut apart and otherwise untangled.

It is therefore desirable to utilize in such work a grapple having facility for grasping and removing materials, and having an association therewith a cutter for severing entangled materials to permit material handling in moderately sized loads. One such device is shown in my U.S. Pat. No. 4,104,792, issued Aug. 8, 1978, which describes a grapple having an attached shearing mechanism, each of which are independently hydraulically operated to permit both a cutting operation and a grappling operation to be manipulated from the operator's station in a backhoe. The device described in this patent requires separate shearing and grappling operations, but permits them to be accomplished with the same machine. The machine is particularly useful for operations such as the reclaiming and reprocessing of junk automobiles, wherein the shearing mechanism may be used to quickly sever the automobile rim and tire to permit separation thereof.

Heavy duty shears of the type that are powered by hydraulic cylinders are proving more and more useful in handling scrap and especially metal scrap of all sorts. Such scrap comes in many different forms, and may be in the form of pipes made of steel or soft iron or cast iron, ranging in sizes from 2 inches or smaller, and up to 8 or 10 inches in diameter or larger; structural beams such as I-beams, channels, angle beams in a large range of sizes, up to 8 or 10 inches across and larger; rods and heavy cables having diameters of 2 to 3 inches and larger, metal sheets and plates and formed metal of all sorts including wheels and automobile and truck frames, and a myriad of long and short pieces of stock and metal pieces that are cast, rolled, stamped or otherwise formed, both singly and in various types of assembly.

The prior art has included numerous shears such as that illustrated in U.S. Pat. No. 4,198,747; U.S. Pat. No. 4,188,721; and U.S. Pat. No. 4,104,792. Typically, these heavy duty shears mount on the dipper stick of a backhoe so that the shears may be controlled fairly well in handling various types of scrap and cutting the scrap into smaller pieces or lengths.

However, the prior art shears have had numerous disadvantages, not permitting the shear to be used as efficiently and rapidly as may be desired, considering the amount of scrap that must be reduced in size before further processing.

SUMMARY OF THE INVENTION

The present invention includes a combination grapple and shear mechanism attachable to a backhoe or similar device having a stick member pivotally attached to a boom. A mounting bracket is pivotally attached to the distal end of the stick member and has a first jaw fixedly attached thereto. A second jaw is pivotally attached to the first jaw. A hydraulic actuating member is connected to at least one of the jaws, and actuation of the hydraulic actuator causes the first and second jaws to open and close, and to engage in interleaving and shearing relationship. Each of the jaws has a shear knife attached along an inner edge and guide plates similarly attached for permitting the jaws to interleave in close, shearing relationship.

It is therefore a primary object of this invention to provide a combination grapple and shear mechanism for attachment to a backhoe or similar machine.

It is a further object of the present invention to provide a grapple and shear mechanism having jaws for relative opening and closing, and for shearing in the closure position.

It is yet another object of the present invention to provide a grapple and shear mechanism having interleaving jaws and replaceable shear knives.

It is another object of the present invention to provide hydraulically actuated jaws and shearing knives for grappling and shearing material in a single operation.

An object of the invention is to provide a new and improved heavy duty shear for handling and severing metal scrap of substantially all shapes and sizes in order to reduce the scrap to small pieces for bulk handling during reprocessing.

Another object of the invention is to provide a novel shear capable of efficiently handling and reducing the size of scrap that exists in long pieces, such as beams, pipes, cables, etc.

A feature of the present invention is a heavy duty shear attachable to the dipper stick of a backhoe. The shear has a rear or lower jaw, and a front or upper jaw opposite to the lower jar and pivoted to it. The upper jaw is opened and closed by the hydraulic cylinder of the backhoe.

The upper and lower jaws have cooperating shear blades with replaceable inserts defining the blades' cutting edges. The shear blades have inner and outer edge portions along their lengths, and such inner and outer edge portions of each blade are obliquely oriented with respect to each other and at an obtuse angle to each other.

The lower jaw has a rigid guide blade extending along the shear blade and spaced therefrom. The guide blade and shear blade are affixed together at their adjacent outer ends, as to prevent sheared scrap metal from wedging between the outer ends of the blades and to prevent such outer ends from spreading further apart.

The guide blade and shear blade are also connected together at their inner ends adjacent the pivot. The connection is provided by a rigid plate welded to the blades and traversing the space between the inner portions of the blades, adjacent the pivot. The rigid connector plate is spaced below the cutting edge of the lower shear blade and prevents sheared metal scrap from being wedged into the space between the shear and guide blades of the lower jaw.

The lower jaw defines an open slot between the outer edge portion of the shear blade and the adjacent guide blade. The outer end of the slot is traversed by a rigid tie plate welded to the shear and guide blades.

The open slot receives the outer end of the upper shear blade as the upper jaw is closed. During closing of the jaws, the shear edges traverse each other in shearing relation. The open slot is significantly wider than the upper shear blade, thus allowing significant open space between the top shear blade and the guide blade while the upper shear blade is in the open slot.

The confronting sides of the upper jaw and the guide blade have wear or guide plates affixed thereon and engaging each other as the upper and lower shear blades are shearing a workpiece. On the guide blade, the wear or guide plate is disposed at the outer end, adjacent the transverse tie plate. The outer end of the upper jaw is arcuately shaped and the wear or guide plate thereon is also arcuately shaped adjacent the outer end.

The guide blade, which is spaced by the width of the open slot from the cutting edge of the lower shear blade, has its upper edge spaced well below the cutting edge of the lower shear blade. The guide blade will thereby provide a workpiece support for the workpiece after the blades have sheared off a length of the workpiece. The backhoe boom and shear may then be swung to the side and thereby move the shear blade along the workpiece in preparation for cutting off another length of the workpiece. As a result, a long girder or pipe or heavy cable may be cut several times into short lengths without dropping the workpiece and without having to repeatedly pick the workpiece off the ground.

The improvements in the shear provide the advantage of facilitating ready and easy handling of long workpieces to cut them repeatedly into short lengths without the need to retrieve them off the ground after each cut. In addition, the outer ends of the lower shear blade and of the guide blade are rigidly interconnected to minimize transverse movement of the shear blades when cutting and to apply transverse pressure against the swinging upper shear blade all during shearing of the work piece.

BRIEF DESCRIPTION OF THE DRAWINGS

The foregoing and other objects of the invention will become apparent from the appended specification, and with reference to the attached drawings, in which:

FIG. 9 is a side elevation view of the shear; and FIG. 10 is a detail section view taken approximately at 10—10 of FIG. 8; and FIG. 11 is a detail section view taken approximately at 11—11 of FIG. 9.

DETAILED SPECIFICATION

Figure 1:
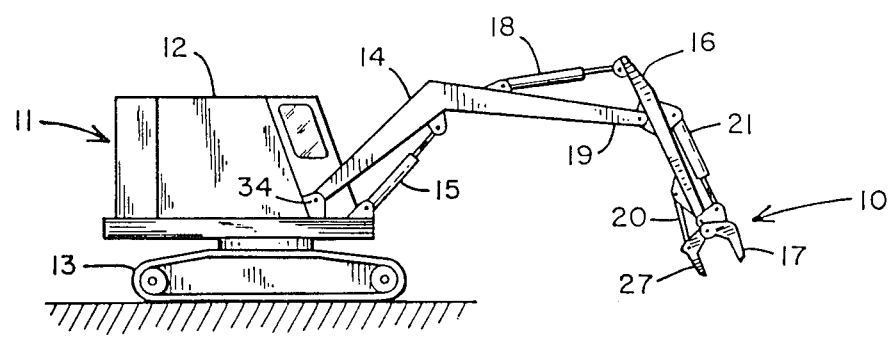
FIG. 1 is an elevation view of a backhoe having an embodiment of the invention attached thereto.

Referring first to FIG. 1, there is shown a mobile vehicle 11 of the type commonly known as a backhoe which is movable over the ground on endless tracks 13. A swinghouse assembly 12 is pivotable about a vertical axis of the machine, and has attached thereto a boom 14 which is pivotable about a horizontal axis 34 of the swinghouse assembly 12. The boom end 19 is pivotally attached to a stick member 16, which may be swung about boom end 19 by means of a double acting hydraulic cylinder-piston motor 18. Similarly, a double acting hydraulic cylinder-piston motor 15 is attached between boom 14 and swinghouse assembly 12 to raise and lower boom 14 about its pivot mounting point.

The distal end of stick member 16 is adapted for attachment to a grapple shear 10. Grapple shear 10 has an upper jaw 17 and a lower jaw 27, and the lower jaw 27 is further attached to stick member 16 by means of pivotable brace 20. Grapple shear 10 may be actuated in a manner to be described in detail hereinafter by actuation of a double acting hydraulic cylinder-piston motor 21 which is connected between stick member 16 and grapple shear 10.

Figure 2:
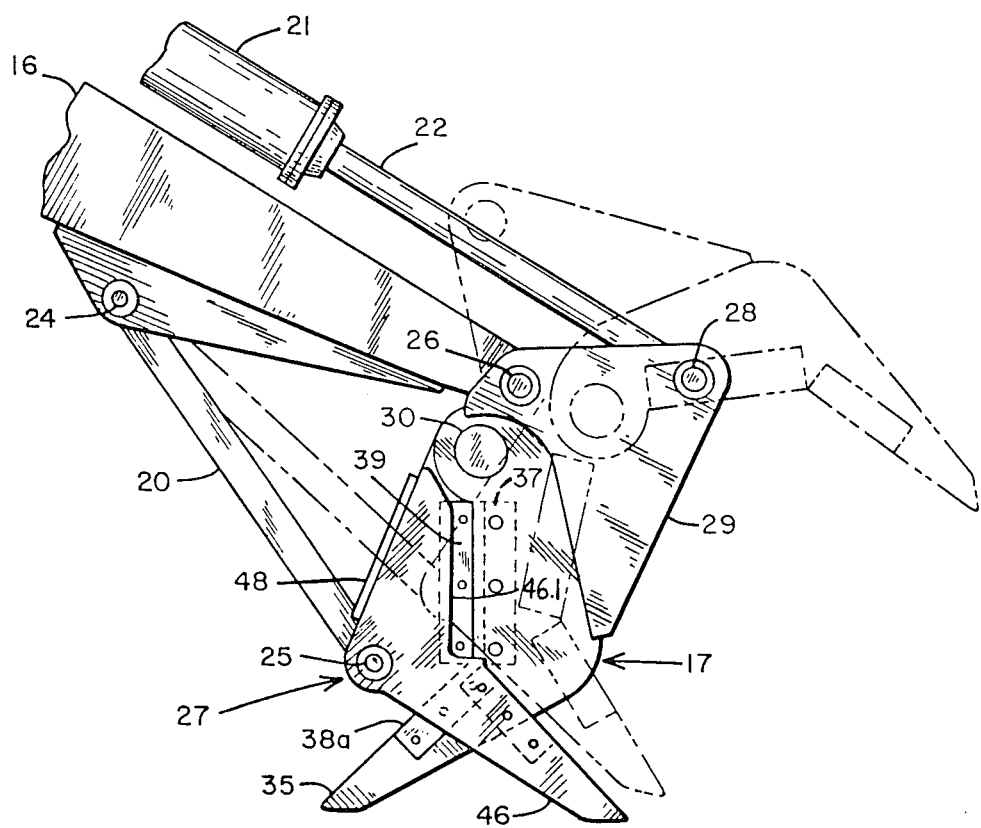
FIG. 2 is a side elevation view of one embodiment of the invention in two operable positions.

FIG. 2 shows a side elevation view of grapple shear 10 attached to stick member 16. Grapple shear 10 is shown in its closed position in solid lines, and is shown in an opened position in dotted outline; both of the illustrated operable positions and all intermediate positions are achieved by selective actuation of motor 21, which causes rod 22 to extend and/or retract under hydraulic actuation control. Upper jaw 17 is attached to the distal end of stick member 16 by means of a mounting bracket 29. Mounting bracket 29 is preferably welded along the top edge of upper jaw 17, and is pivotally attached to stick member 16 by pin 26. Rod 22 is connected to mounting bracket 29 at pivot pin 28. The precise shape and configuration of mounting bracket 29 is dependent upon the particular mobile vehicle to which the invention is to be attached; mounting brackets designed to accommodate attachment to all of the known models of mobile vehicle with which the invention is usable are readily apparent.

Brace 20 is connected between a pivot pin 24 on stick member 16 and a pivot pin 25 on lower jaw 27. The length of brace 20 is selected so as to position lower jaw 27 and upper jaw 17 in a full closure relationship at the end of the full stroke of rod 22 from the double acting hydraulic cylinder-piston motor 21. This enables the maximum foot pounds of energy to be delivered by motor 21.

Mounting bracket 29 is pivotally attached to stick member 16 at pin 26, whereas rod 22 is attached to mounting bracket 29 at offset pin 28. Therefore, when rod 22 is extended and retracted under hydraulic actuation and control, bracket 29 and the entire jaw assembly consisting of upper jaw 17 and lower jaw 27 pivot about pin 26. Since brace 20 limits the travel of lower jaw 27, hydraulic actuation of rod 22 causes upper jaw 17 to move in relative opening and/or closing relationship to lower jaw 27. FIG. 2 shows that the relative movement of lower jaw 27 over the full range of hydraulic actuation positions of rod 22 is rather limited; by contrast, the relative movement of upper jaw 17 over this same range of hydraulic actuation of rod 22 is rather extensive. This provides a favorable power leverage to increase the number of foot pounds of energy applied to shear knives 37 and 39 as the jaws 7 and 27 move into closure position. An examination of the relative changes of positions of shear knives or shearing inserts 37 and 39 as jaws 17 and 27 approach full closure shows that a scissors action occurs between the knives as the jaws become fully closed. This scissors action greatly facilitates the shearing ability of the apparatus.

Figure 3:
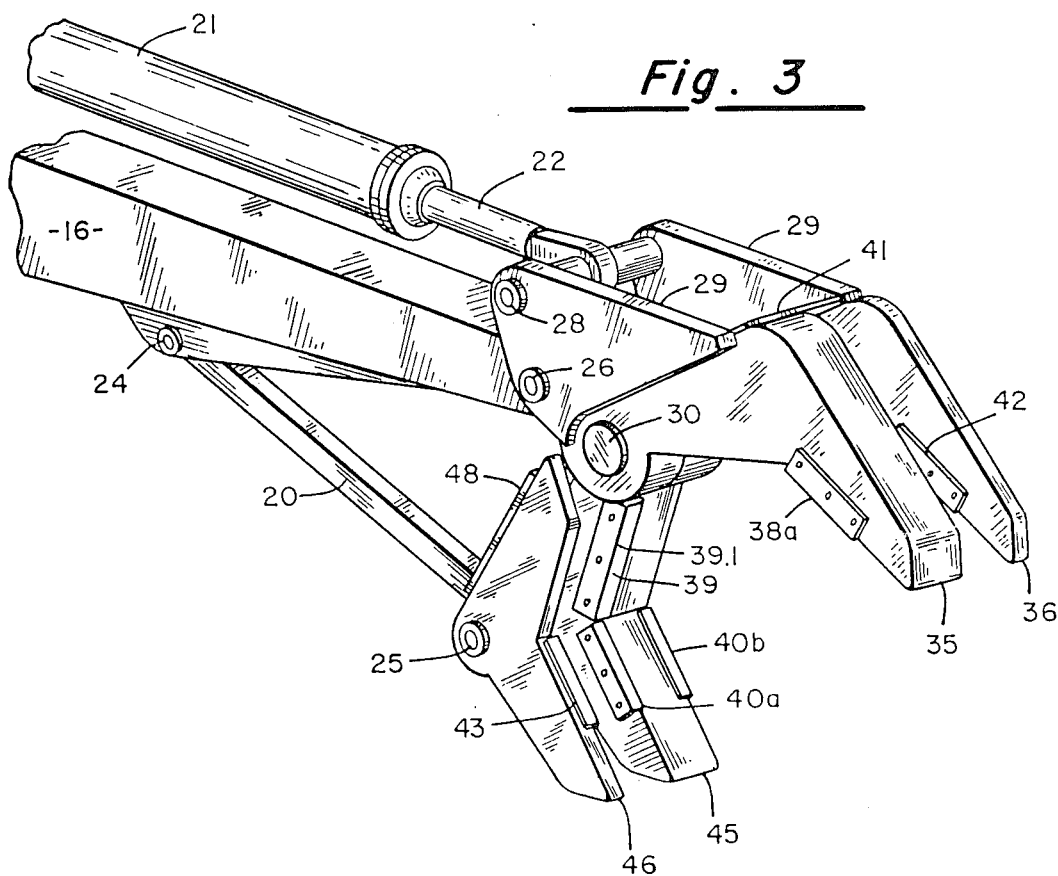
FIG. 3 is an isometric view of the embodiment of FIG. 2.
Figure 5:
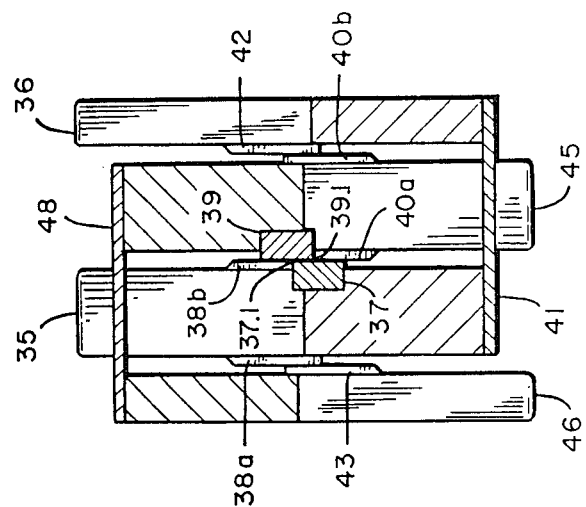
FIG. 5 is a section view taken along the lines 5—5 of FIG. 4.

FIG. 3 shows an isometric view of the invention with jaws 17 and 27 in an open position. Upper jaw 17 has a plurality of jaw teeth, including a main shear tine 35 or blade and a grapple shear tine or blade 36, each of which is welded to mounting bracket 29. Tines 35 and 36 are generally L-shaped, and are fixed in spaced-apart relation to one another by means of spacer plate 41. Similarly, lower jaw 27 has a plurality of jaw teeth, including an L-shaped main shear tine or blade 45 and a grapple tine or guide blade 46 which are held in fixed spaced-apart relation to each other by means of a spacer plate 48. Main shear tine 35 has a shear knife or insert bar 37 carried on a seat and secured to an inner face of its upper leg as seen in FIGS. 2 and 5, by means of threaded or other removable fasteners. Shear knife 37 is preferably made from high quality carbon steel of generally rectangular cross-section. Main shear tine 45 has a shear knife 39 secured to an innerface of its upper leg in a similar similar fashion to shear knife 37. Shear knives 37 and or insert bar 39 carried on a seat and face each other in very close shearing contact at their edges 37.1, 39.1 respectively.

Figure 4:
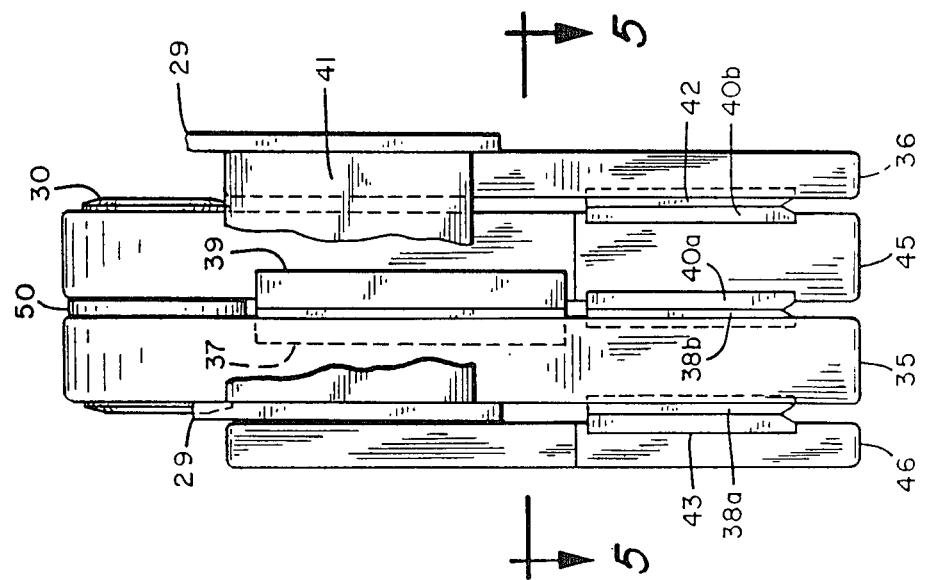
FIG. 4 is an elevation view of the embodiment of FIG. 2.

Shear tines 35 and 45 are pivotable about bearing pin 30 in opening and closing relationship to each other. Tines 35 and 36 respectively interleave with tines 45 and 46, and are maintained in spaced-apart relation by a plurality of guide plates attached to the respective tines. Guide plates 38a and 38b are attached along either side of tine 35; guide plate 42 is attached along an inner side of tine 36; shearing inserts or guide plates 40a and 40b are attached along either side of tine 45; and guide plate 43 is attached along an inner side of tine 46. When the upper and lower jaws are interleaved guide plates 43 and 38a come into sliding contact with one another; shearing inserts or guide plates 38b and 40a come into shearing and sliding contact with one another; guide plates 40b and 42 come into sliding contact with another. All of the guide pates are attached by removable fasteners so that they may be replaced if they become worn. The relationship of the respective tines and guide plates is best seen in FIG. 4, which is a view taken along the lines 4—4 of FIG. 2 with upper jaw 17 and lower jaw 27 in the fully closed position. A spacer bearing 50 maintains separation between tines 35 and 45 to permit the proper shearing of knives 37 and 39.

Guide tine or blade 46 has the inner end portion 46.1 of its upper edge recessed below the adjacent edge of shear knife 39, with the effect that when a workpiece is cut by shear knives 39 and 37, one end of the workpiece adjacent the knives will continue to be supported on the recessed portion of guide tine 46. The workpiece may be grabbed again by the shear tines without allowing the work piece to fall to the ground.

FIG. 5 shows a cross-sectional view taken along the lines 5—5 of FIG. 4 with the upper and lower jaws in fully closed position. The respective guide plates are in relative contact with one another to assure proper spacing of the respective tines. In the fully closed position, shear knives 37 and 39 are in slightly overlapped adjacent position to assure complete shearing action. Spacer plate 48 holds shear tine or blade 45 and grapple tine 46 in fixed, spaced-apart relationship to one another in lower jaw 27. Similarly, spacer plate 41 holds shear tine or blade 35 and grapple tine 36 in rigid, spaced-apart relationship relative to one another to upper jaw 17. Spacer bearing 50 spaces shear tine 35 of upper jaw 17 from shear tine 45 of lower jaw 27 by a distance just great enough to provide shearing action between shear knives 37 and 39. The various guide plates come into contact when the upper and lower jaws are interleaved, and act to ensure that proper jaw spacing is maintained for correct shearing action.

Shear knives 37 and 39 are constructed from hardened steel, and are respectively attached to their shear tines by means of threaded, counter-sunk fasteneres. Since the shear knives have a rectangular cross section they may each be mounted with either rectangular surface in facing relationship to the other shear knife, and may be inverted to their respective mounting positions.

Figure 6:
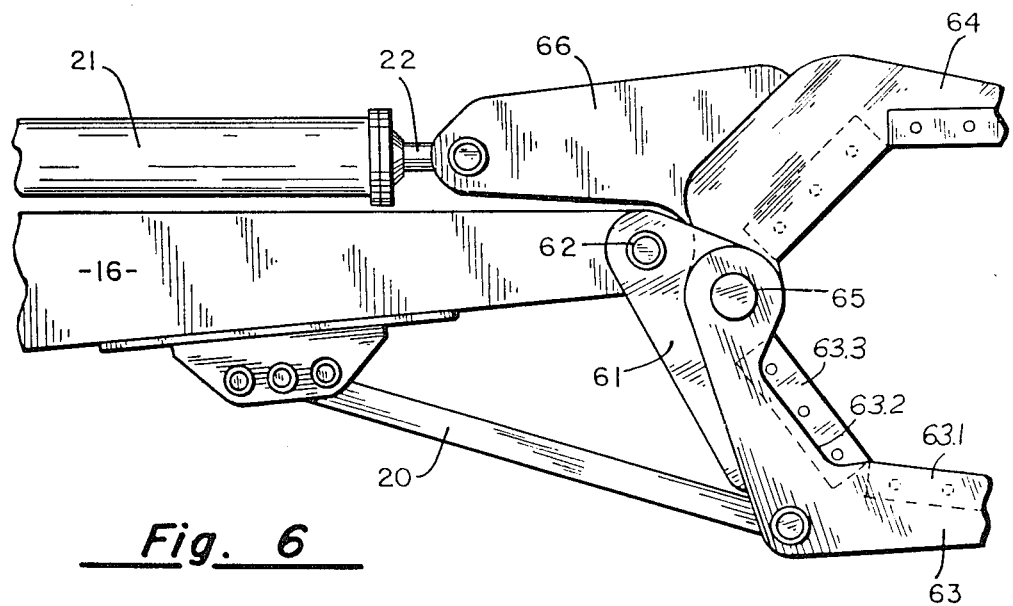
FIG. 6 is a side elevation view of a modified form.

FIG. 6 shows a side elevation view of another embodiment of the invention. In this embodiment a mounting bracket 61 is pivotally attached to stick member 16 at pin 62, and mounting bracket 61 is fixedly attached to lower jaw 63. Upper jaw 64 is pivotally attached to lower jaw 63 at pin 65, and a bracket 66 is fixedly attached to upper jaw 64. Rod 22 is attached to bracket 66, and forms a part of hydraulic cylinder-piston motor 21 as has hereinbefore been described. Brace 20 is connected between stick member 16 and lower jaw 63 as has hereinbefore been described.

In FIG. 6 the guide tine 63.1 of the lower jaw 63 has its upper edge 63.2 recessed below the cutting edge of the shear tine 63.3. The edge 63.2 will support the end of the workpiece after shearing is completed as to prevent the workpiece from falling to the ground. The dipper stick 16 and the attached jaws need merely be swung to the side to slide along the workpiece so that another piece of the workpiece may be sheared off.

In a further alternative embodiment of the invention brace 20 may be replaced by a hydraulic cylinder-piston motor, to provide a further degree of control and power actuation of the jaws.

In operation, the apparatus may be manipulated as a grapple from the operator's station in the vehicle swinghouse assembly according to normal operating procedures. The jaws may be opened and closed in normal fashion for grasping and lifting operations by actuation of cylinder and piston motor assembly 21 and 22. Since the ends of the tines overlap one another before the jaws are fully closed, a containment space is created within the partially closed jaws for capturing work pieces without shearing. However, if cylinder 21 is actuated to cause the jaws to fully close, then the workpiece captured between the upper and lower jaws becomes sheared by the scissors action of the shear knives.

The relative positions of the pivot points of the apparatus provides increased energy availability from the double acting hydraulic cylinder-piston motor at and near the relative positions of the jaws where the shear knives come together. The braced position of the lower jaw permits full extension of rod 22 at the point where jaw closure occurs, thus providing maximum foot pounds of utilization of the motor. The respective guide plates which interface between the shear tines prevent the tines from spreading during a shearing operation to assure clean cutting of the workpiece.

As the jaws are closed to perform a cutting operation the guide plates and shearing inserts of respective pairs, i.e. plates 38a and 43, 38b and 40a, 40b and 42, come into sliding engagement with one another. Near the full closure position of the jaws shear knives 37 and 39 move into confronting relationship with each other, and commence shearing as full closure of the jaws takes place. The guide plates guide the respective tines 46, 35, 45, 36 into interleaving relationship during full closure of the jaws, an space plates 41 and 48 hold the respective tines in rigid, spaced apart relation during the shearing operation, and prevent any flexing of the tines and relative separation of shear knives 37 and 39 during cutting.

Shear knives 37 and 39 are each made from rectangular bar steel stock and may be removably attached to tines 35 and 45. The respective mounting holes in the shear knives are preferably symmetrically positioned to permit the shear knives to be attached in reversible relationship by removably mounting bolts. Since the primary knife edge wear that occurs during use is along the respective edges 37.1, 39.1 which bear the primary cutting load, the capability of removing and reversing the knives provides four clean cutting knife edges for each shear knife before the shear knives must be removed or sharpened. This greatly extends the useful life of the shear knives.

The present invention may be embodied in other specific forms without department from the spirit or essential attributes thereof, and it is therefore desired that the present embodiment be considered in all respects as illustrative and not restrictive, reference being made to the appended claims rather than to the foregoing description to indicate the scope of the invention.

Figure 7:
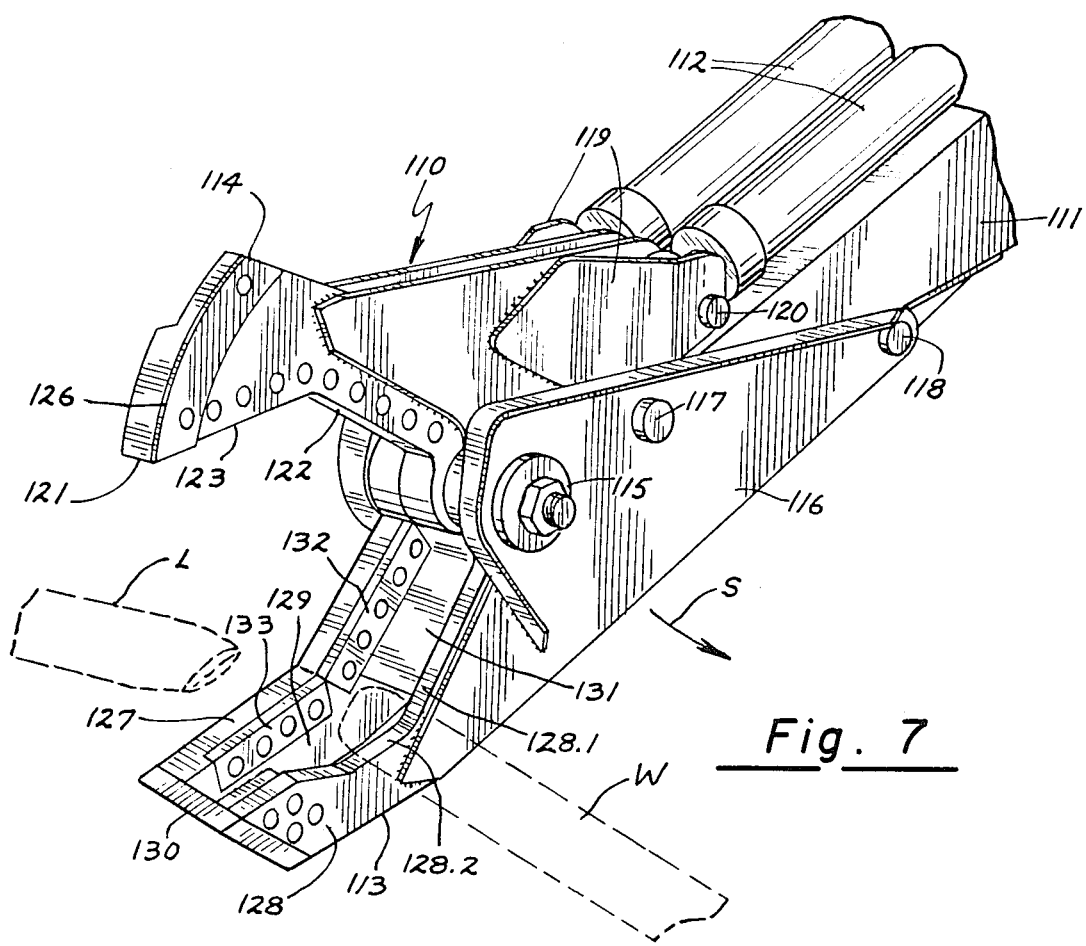
FIG. 7 is a perspective view of the shear attached to the dipper stick of a backhoe.
Figure 8:
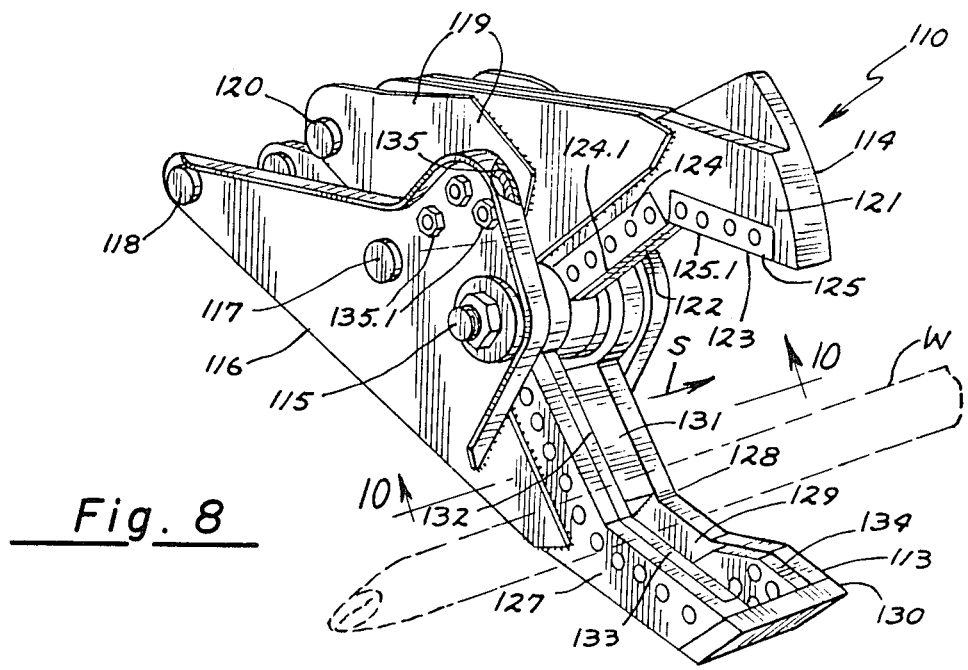
FIG. 8 is another perspective view of the shear, detached from the backhoe.

In FIG. 7, the heavy duty shear is indicated in general by numeral 110 and is to be mounted upon the rigid dipper stick 111 which is a portion of the boom of a backhoe, and is to be connected to the hydraulic cylinder or cylinders 112 of the backhoe which cylinders lie along the dipper stick 111, and have their cylinder ends affixed to the backhoe.

The shear 110 includes a lower or rear jaw 113 and an upper or front jaw 114 which are interconnected by a pivot and bearing structure 115 which accommodates swinging of the upper jaw 114 relative to the lower jaw 113.

The lower jaw 113 has rigid mounting plates 116 carrying removable pins 117 and 118, thereby adapting the mounting plates 116 for attachment, rigidly, to the dipper stick 111 of the backhoe.

The upper jaw 114 also has a bracket made of rigid plates 119 carrying removable pins 120 adapted for attachment to the extendable piston rod 112.1 of the hydraulic cylinder 112. The bracket plates 119 and the mounting plates 116 may take different shapes, depending upon the exact nature of the connections to the dipper stick 111 and to the hydraulic cylinder 112, which connections may vary from one particular backhoe to backhoes of another make or model.

The upper jaw 114 defines a shear blade 121 which has inner and outer edge portions 122 and 123, respectively, oriented obliquely of each other. The upper shear blade 121 has hardened cutting inserts 124 and 125 extending along the inner and outer portions of the blade and defining shear edges 124.1 and 125.1. The inserts 124 and 125 are formed of extremely hard high carbon steel and are elongate bar shaped as to provide for separate edges which may be put into use by reorienting the inserts on the blade 121. The inserts 124 and 125 are detachably mounted on the blade 121 as by mounting bolts in the holes provided.

The upper shear blade 121 also has a pressure plate or wear plate 126 secured on the left side adjacent the outer end 121.1 and arcuately shaped about the center of the pivot 115. The pressure plate 126 is welded to the blade 121, but may be replaceable when it is worn. The lower jaw 113 has a lower shear blade 127 and a rigid guide blade 128 extending along each other and outwardly from the pivot 115. The shear blade 127 and the guide blade 128 are rigidly affixed to each other and to the mounting plates 116 so as to be rigid with the dipper stick 111 of the backhoe when mounted thereon. Although the lower shear blade 127 and the guide blade 128 are spaced widely apart to define an open slot 129 into which the upper shear blade 121 may swing, the lower shear blade 127 and the guide blade 128 are rigidly interconnected at their outer ends by a rigid tie plate 130 which is welded to both the shear blade 127 and the guide blade 128.

The inner portions of the shear blade 127 and the guide blade 128, adjacent the pivot 115, are also interconnected by a transverse rigid plate 131, which is also affixed as by welding to both the shear blade and the guide blade 128. The plate 131 obstructs the open slot 129 adjacent the inner portions of the shear blade 127 and quide blade 128.

The lower shear blade 127 also has replaceable inserts 132 and 133 defining the inner and outer cutting edge portions 132.1 and 133.1 of the lower shear blade 128. These inner and outer portions of the shear blade 128 are oriented obliquely with respect to each other and at an obtuse angle; and similarly, these inner and outer edge portions of the lower shear blade 128 are oriented at acute angles with respect to the inner and outer edge portions 124.1 and 125.1 of the upper shear blade 121 so that the upper and lower shear blades 121 and 127 cooperate with each other in cradling a workpiece W approximately midway along the length of the blades. The inserts 132 and 133 are also demountably attached as by bolts so that these inserts may be rearranged so that any of their four edges may be arranged as cutting shear edges before the inserts need to be replaced.

The guide blade 128 has its inner and outer portions 128.1 and 128.2 of its upper edge located well below the inner and outer edge portions 132.1 and 133.1 of the lower shear blade 127, as best seen in FIG. 9. These inner and outer upper edge portions 128.1 and 128.2 are oriented at oblique angles with respect to each other, at an angle very similar to the angle between the inner and outer edge portions of the lower shear blade 127. The top surface of the transverse plate 131 lies substantially flush with the inner portion 128.1 of the top edge of the guide blade 118, and accordingly, the plate 131 is located below the inner insert 132 of the lower shear blade. Because the upper edge of the guide blade 128 lies below the level of the shear edges of the shear blade 127, the workpiece W, after it is sheared and a short length L of the workpiece is severed, the workpiece will settle onto and be supported by the upper edge portions 128.1 and 128.2 of the guide blade so that the workpiece need not be picked up off the ground again, but is ready for additional cuts to be made. After the short length L has been cut from the workpiece W, the shear 110 and the boom and dipper stick 111 of the backhoe will be swung to the side, substantially in the direction of arrow S so that the lower jaw 113, which continues to support the workpiece W on the guide blade 113, will simply slide along the workpece to a new location, whereupon the workpiece may be cut again, or the top jaw 114 may be closed to grip the workpiece, thereby allowing the workpiece to be pulled to a new location where cutting may occur.

The guide blade 128 is spaced sufficiently from the shear blade 127 so that when the upper shear blade 121 is swung down into the open slot 129, there remains a significant open space 129.1 between the confronting faces of the upper blade 121 and the guide blade 128. As a result, the likelihood of wedging a piece of the scrap into the open space is minimized.

The guide blade also carries a wear or pressure plate 134 removably affixed as by bolts to the side of the guide plate 128, at its outer end. The plate 134 engages the pressure or wear plate 126 of the upper shear blade 121 when the shear blade is swung downwardly across the lower shear blade and into the open slot 129. Another pressure pad 135 is mounted on the mounting panel 116, to the right of the upper shear blade 121, and in sliding engagement with the front portion of plate 119, at a location above the pivot 115. The pressure pad 135 is adjustable by screws 135.1 with the effect that the pressure pad 135 will apply force against the top jaw 114 as the shear blade 121 moves transversely across the lower shear blade 127 so as to cooperate with the pressure pads 126 and 134 in maintaining the upper shear blade in shearing engagement with the lower shear blade 127.

By securing the guide blade 128 rigidly to the lower shear blade 127, and guiding the movement of the upper shear blade 121 by the pressure pads or wear plates 134 and 126 and the pressure pad 135 moving against the plate 139, the two shear blades are maintained in shearing engagement with each other during the downward shearing movement of the upper shear blade 121. In addition, after the shearing of the workpiece W has been completed, the end of the workpiece continues to be supported upon the upper edge of the guide plate 128 so that the workpiece does not have to be retrieved off the ground before another cut can be made. The shear 110 and backhoe stick 111 are simply swung to the side in the direction of arrow S, moving the lower jaw beneath the workpiece so that another cut can be readily made. Alternatively, the upper jaw 114 may be moved downwardly to grip the workpiece to pull it to a new position before the cut is made.

What is claimed is:

1. A heavy duty grapple shear for use with the forwardly extending boom structure and hydraulic system of a material handling machine in grasping and reducing workpieces to smaller size, comprising:

first and second cooperative shearing jaws swingable relative to each other, means mounting the jaws on the boom structure and including an elongate frame means attachable to the boom structure, the elongate frame means being connected to the first shearing jaw, the second shearing jaw having means adapted for connection to the hydraulic system for producing swinging of the second jaw as to open and close the jaws in a shearing relation to each other, the elongate shearing jaws extending endways and forwardly of the elongate frame means when the jaws are in open condition relative to each other, the shearing jaws having elongate shear blades with inner and outer ends and intermediate portions between the ends, the blades being arranged with their outer ends traversing each other during closing while the intermediate portions remain spaced apart, the outer ends of the shear blades having tooth-like tips for embracing and picking up small workpieces as the jaws close onto each other, one of the shear blades having a pair of substantially linear edges in end to end relation with each other at the intermediate portion and forming an obtuse angle with each other, the other of the shear blades also having elongate edge means across which said linear edges move in shearing relation, whereby the endways and forwardly extending shear blades accommodate picking workpieces off the ground or out of a rubble heap and drawing the workpieces inwardly of the outer ends of the blades to be sheared, and the first shearing jaw also having an elongate grapple tine extending along and spaced from the shear blade thereof, the grapple tine having a top workpiece supporting edge across which a workpiece lies and is supported as the workpiece is sheared by the shear blades and wherein a portion of the supporting edge is spaced below an adjacent edge portion of the shear blade, the grapple tine also having a tooth-like tip adjoining the tip of the shear blade on the first jaw.

2. A heavy duty grapple shear according to claim 1 wherein each of the shear blades of the first and second shearing jaws have a pair of linear edges in end to end relation with each other at the intermediate portion and forming an obtuse angle with each other, the frame means being disposed entirely rearwardly of the outer ends of the shear blades to permit said outer ends to grasp workpieces without interference from any of the frame means.

3. The heavy duty grapple shear as defined in claim 1 wherein the jaws include removable inserts defining the cutting edges of the inner end portions of the jaws.

4. The heavy duty grapple shear as defined in claim 1 wherein the jaws include removable hardened inserts defining at least portions of the cutting edges of both the inner and outer end portions of the jaws.

5. The heavy duty grapple shear as defined in claim 1 wherein the outer ends of the shearing jaws have inner workpiece engaging sides and outer sides opposite said inner sides, said inner and outer sides converging with respect to each other in said tooth-like tips.

6. A heavy duty grapple shear according to claim 5 wherein said inner and outer sides of the outer ends converge with respect to each other in an acute angular relation.

* * * * *

UNITED STATES PATENT AND TRADEMARK OFFICE
CERTIFICATE OF CORRECTION

PATENT NO. : 4,771,540

DATED : September 20, 1988

INVENTOR(S) : Roy E. LaBounty

It is certified that error appears in the above-identified patent and that said Letters Patent is hereby corrected as shown below:

Column 5, line 51, after "a" insert --similar--; after "knife" insert --or insert bar--; and after "39" insert --carried on a seat and--.

Column 5, line 52, delete "similar".

Column 5, line 53, delete "or insert bar"; delete "carried on a seat and".

Column 6, line 30, delete the second "to" and replace it with --in--.

Column 6, line 44, delete "to" and replace it with --in--.

Column 8, line 29, delete "the" and replace it with --its--.

Column 9, line 26, delete "workpece" and replace it with --workpiece--.

Signed and Sealed this

Twenty-eighth Day of February, 1989

*Attest:*

DONALD J. QUIGG

*Attesting Officer*  *Commissioner of Patents and Trademarks*